United States Patent
Yan et al.

(10) Patent No.: US 10,114,504 B2
(45) Date of Patent: Oct. 30, 2018

(54) TOUCH SCREEN, DISPLAY DEVICE AND FABRICATION METHOD OF TOUCH SCREEN

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Jinglong Yan, Beijing (CN); Jilei Gao, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/341,222

(22) Filed: Nov. 2, 2016

(65) Prior Publication Data

US 2017/0123579 A1    May 4, 2017

(30) Foreign Application Priority Data

Nov. 20, 2015 (CN) .......................... 2015 1 0741385

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04104* (2013.01)

(58) Field of Classification Search
CPC ...... G06F 3/0416; G06F 3/0412; G06F 3/044; G06F 2203/04103; G06F 2203/04104; G06F 2203/04111

See application file for complete search history.

(56) References Cited

U.S. PATENT DOCUMENTS

2012/0249444 A1* 10/2012 Lee ..................... G06F 3/0412
 345/173
2013/0033439 A1* 2/2013 Kim ................... G02F 1/13338
 345/173

(Continued)

FOREIGN PATENT DOCUMENTS

CN 202854766 U 4/2013
CN 104750339 A 7/2015

OTHER PUBLICATIONS

First Chinese Office Action dated Apr. 27, 2018; Appln. No. 201510741385.1.

*Primary Examiner* — Tom Sheng
(74) *Attorney, Agent, or Firm* — Ladas & Parry LLP (57) ABSTRACT

A touch screen, a display device and a fabrication method of a touch screen are provided. The touch screen includes a gate layer, an insulating layer, a source-drain electrode layer, a first Indium Tin Oxide (ITO) layer, a protective layer and a second ITO layer. The insulating layer is overlaid on the gate layer, the source-drain electrode layer is overlaid on the insulating layer, the first ITO layer is overlaid on the source-drain electrode layer, the protective layer is overlaid on the first ITO layer, and the second ITO layer is overlaid on the protective layer; the gate layer includes a touch driving electrode, the source-drain electrode layer includes a touch sensing electrode line, and the second ITO layer includes a touch sensing electrode pattern.

11 Claims, 4 Drawing Sheets

(56) References Cited

U.S. PATENT DOCUMENTS

| | | | |
|---|---|---|---|
| 2013/0257774 A1* | 10/2013 | Kim | H01L 27/1259 345/173 |
| 2014/0160066 A1* | 6/2014 | Kim | G06F 3/0412 345/174 |
| 2014/0168537 A1* | 6/2014 | Han | G06F 3/0412 349/12 |
| 2016/0004346 A1* | 1/2016 | Zhao | G06F 3/0412 345/174 |
| 2017/0220164 A1* | 8/2017 | Shi | G06F 3/0412 |

* cited by examiner

TOUCH SCREEN, DISPLAY DEVICE AND FABRICATION METHOD OF TOUCH SCREEN

TECHNICAL FIELD

Embodiments of the present disclosure relate to a touch screen, a display device and a fabrication method of a touch screen.

BACKGROUND

With continuous development in the flat panel display technology, more and more display devices are provided with touch screens. At present, in accordance with working principles and media for transmitting information of the touch screens, the touch screens can be divided into four categories, i.e., resistive touch screens, capacitive sensing touch screens, infrared touch screens and surface acoustic wave touch screens, respectively. For the capacitive sensing touch screens, the In-Cell touch technology has become mainstream in the touch technical field and the new development direction in the future due to advantages such as low cost, low power consumption and capability of realizing multi-touch and so on.

At present, some of the In-Cell touch designs use a time-division scanning method, in which each scanning cycle is divided into a time period for a display operation and a time period for a touch operation, which affects the detecting frequency of the touch screen. Therefore, how to realize a touch function, improve the detecting frequency of the touch screen and reduce influence on display while displaying, has become a research hotspot nowadays.

SUMMARY

An embodiment of the present disclosure provides a touch screen, and the touch screen comprises a gate layer, an insulating layer, a source-drain electrode layer, a first Indium Tin Oxide (ITO) layer, a protective layer and a second ITO layer. The insulating layer is overlaid on the gate layer, the source-drain electrode layer is overlaid on the insulating layer, the first ITO layer is overlaid on the source-drain electrode layer, the protective layer is overlaid on the first ITO layer, and the second ITO layer is overlaid on the protective layer, the gate layer includes a touch driving electrode, the source-drain electrode layer includes a touch sensing electrode line, and the second ITO layer includes a touch sensing electrode pattern.

Another embodiment of the present disclosure provides a display device comprising the above-described touch screen.

Still another embodiment of the present disclosure provides a fabrication method of a touch screen, and the method comprises: forming an insulating layer on a gate layer, forming a source-drain electrode layer on the insulating layer, forming a first Indium Tin Oxide (ITO) layer on the source-drain electrode layer, forming a protective layer on the first ITO layer, and forming a second ITO layer on the protective layer. The gate layer includes a touch driving electrode; the source-drain electrode layer includes a touch sensing electrode line; the second ITO layer includes a touch sensing electrode pattern.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
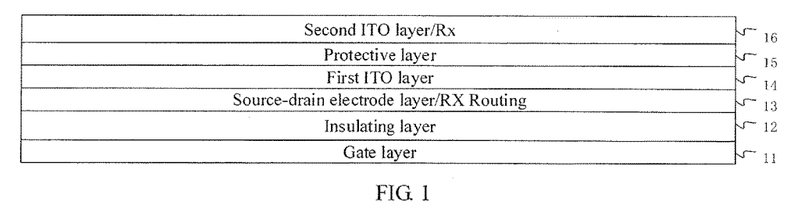
FIG. 1 is a structural schematic diagram of a touch screen provided by an embodiment of the present disclosure.

An embodiment of the present disclosure provides a touch screen, and referring to the schematic view of FIG. 1, the touch screen comprises a gate layer 11, an insulating layer 12, a source-drain electrode layer 13, a first indium tin oxide (ITO) layer 14, a protective layer 15 and a second ITO layer 16, which are stacked in order.

For example, the insulating layer (GI layer) 12 may be made of $SiO_2$ or $SiNx$ or $SiNxOy$; for example, the gate layer (Gate layer) 11 is formed on a base substrate (not shown), a structure layer such as a buffer layer or the like may be arranged between the gate layer 11 and the base substrate, and the base substrate is, for example, a glass substrate, a quartz substrate, a plastic substrate or the like. The protective layer 15 is, for example, a passivation layer (PVX), which may be an inorganic or organic passivation layer. The source-drain electrode layer (S/D layer) 13 is overlaid on the insulating layer 12, the first ITO layer 14 is overlaid on the source-drain electrode layer 13, the protective layer 15 is overlaid on the first ITO layer 14, and the second ITO layer 16 is overlaid on the protective layer 15. Indium Tin Oxide (ITO) is a transparent conductive material. Optical and electrical properties of the formed ITO layer may be adjusted by adjusting a proportion of indium and tin in the raw material, a depositing method, degree of oxidation, and sizes of crystal grains. A thin ITO layer has good transparency but high impedance, while a thick ITO layer has poor transparency but low impedance.

In order to improve a detecting frequency of the touch screen, a touch driving electrode (Tx Routing) is further fabricated in the gate layer 11 in addition to a gate line, and a touch sensing electrode line (Rx Routing) is further fabricated in the source-drain electrode layer 13 in addition to a source-drain electrode and a data line, and the second ITO layer 16 includes a touch sensing electrode pattern (Rx pattern). That is, the gate layer 11 includes a touch driving electrode, the source-drain electrode layer 13 includes a touch sensing electrode line, and the second ITO layer 16 includes a touch sensing electrode pattern. For example, the touch sensing electrode pattern (Rx pattern) on the second ITO layer 16 is connected with the touch sensing electrode line (Rx Routing) in the source-drain electrode layer 13 through a via hole in the protective layer 15.

Figure 2:
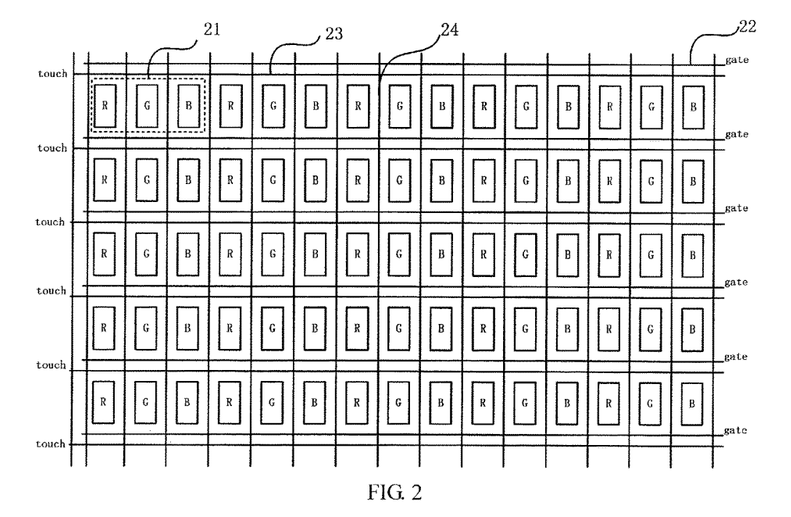
FIG. 2 is a structural schematic diagram of a touch driving electrode provided by an embodiment of the present disclosure.

FIG. 2 is a structure of a touch driving electrode of an embodiment of the present disclosure, and the structure is similar to a Dual-Gate structure (two gate scanning lines are arranged between adjacent rows of sub-pixels). An array substrate of a liquid crystal display device may include gate lines, data lines and pixel electrodes. For example, one pixel is formed by sub-pixels of R, G and B together. In the diagram, the data lines 24 are arranged longitudinally for applying data signals (grayscale signals) to the sub-pixels, and the gate lines 22 are arranged transversely for applying scanning signals to the sub-pixels. In the embodiment of the present disclosure, input lines for inputting touch driving signals (touch signals) parallel to the gate lines are formed; alternatively, for example, at least a portion of the gate lines is used as input lines for inputting touch driving signals. That is, the gate layer (referring to FIG. 1) in the array substrate of the embodiment shown in FIG. 2 includes a plurality of gate lines 22 and a plurality of touch driving electrode lines 23. For example, a touch driving electrode is formed by touch driving electrode lines 23. For example, the gate lines 22 are parallel to the touch driving electrode lines 23, and the gate lines 22 and the touch driving electrode lines 23 are arranged at intervals; that is, each gate line 22 is parallel to one touch driving line 23.

For example, one Tx channel may be formed by a plurality of (two or more) touch driving lines 23, one Tx channel may be formed by a plurality of touch driving lines in odd-numbered columns 1, 3, 5 . . . 15, one Tx channel may be formed by a plurality of touch driving lines in even-numbered columns 2, 4, 6 . . . 16, or the Tx channel may be formed in another manner, which is not limitative to the embodiment of the present disclosure. For example, two or more touch driving electrode lines are connected with each other through via holes formed in the insulation layer and the connection electrodes (e.g., formed in the second ITO layer) on the insulation layer so as to form one Tx channel. As shown in the diagram, all the Tx channels are used for determining a position in a longitudinal direction. For example, the data lines 24 are provided perpendicular to the gate lines 22 and the touch driving electrode lines 23.

In order to make a gate line 22 and a touch driving electrode line 23 which are adjacent to each other to cooperate with each other, for example, a switching element may be provided in the peripheral region (i.e., a non-operational region or a non-display region) and between the gate line 22 and the touch driving electrode line 23 which are adjacent to each other, and upon this switching element being switched on, the gate line 22 and the touch driving electrode line 23 are electrically connected. As shown in the schematic view of FIG. 3, this switch element is a thin film transistor, comprising a gate electrode 110, a gate insulation layer 125, an active layer 125 (e.g., an amorphous silicon layer), and source-drain electrodes 131 and 132. A passivation layer (PVX, e.g., protection layer) 150 covers the switching element. An ITO layer is formed on the passivation layer 150 and comprises a first ITO pattern 141 and a second ITO pattern 142. The first ITO pattern 141 is electrically connected to the gate electrode 110 and one source-drain electrode 131 through via holes; the second ITO pattern 142 is electrically connected to the touch driving electrode line (Tx) and the other source-drain electrode 132 through via holes. The gate electrode 110 is electrically connected to the gate line. When a gate signal (a ON signal) is applied to the gate line, the switching element is turned on, and in turn the gate signal is applied to the touch driving electrode line by way of the ITO patterns 141 and 142, the source-drain electrodes 131 and 132, and the active layer 125. In this way, the gate signal can be used as a touch driving signal. In another example, one touch driving electrode line is provided between two gate lines and is connected with each of the adjacent gate lines by means of a switching element, and therefore, when either of the adjacent gate lines are scanned (i.e., applied with a gate signal), the touch driving electrode line is applied with a touch driving signal. This configuration is favorable to increase the detecting frequency of this touch driving electrode line.

A design scheme provided by the embodiment of the present disclosure is used, and thus a report rate (detecting frequency) of the touch screen may be improved through a refreshing mode of each frame. If the refreshing mode of each frame is changed to 1/3/5/7 rows . . . or 2/4/6/8 rows . . . , the detecting frequency is 2 times as higher as the display frequency, and is up to 120 Hz. Taking scanning and display of a 1920*1080 touch screen for example, for the 1080 gate lines, 1080 touch driving electrode lines are provided correspondingly for example in an alternate manner, each touch driving electrode line is electrically with two adjacent gate lines with switching elements respectively; for example, the touch driving electrode lines in rows 1/3/5/7 . . . are combined to provide a Tx channel, that is, for the touch driving electrode lines in odd-numbered rows, every four touch driving electrode lines are combined to provide a Tx channel; in a same way, the touch driving electrode lines in rows 2/4/6/8 . . . are combined to provide a Tx channel, that is, for the touch driving electrode lines in even-numbered rows, every four touch driving electrode lines are combined to provide a Tx channel. In operation, gate signals are applied to an odd-numbered gate lines first, the touch driving electrode lines adjacent to these odd-numbered gate liens are applied with touch driving signals (equivalent to gate signals) and thus in the manner of using the gate signals as a touch signal provided by the embodiment of the present disclosure, the gate signals over the gate lines in rows 1/3/5/7 may be combined to obtain a touch signal for connecting with a touch Integrated Circuit (IC); and in a similar way, until the gate signals of the gate lines in rows 1073/1075/1077/1079 are combined to obtain a touch signal for connecting with the touch IC. In this way, when half of the screen is scanned and displayed, all the touch driving electrode lines are also scanned, that is, the entire screen has completed a touch scan. Next, the gate signals are applied to even-numbered gate lines, the touch driving electrode lines adjacent to these even-numbered gate liens are applied with touch driving signals (equivalent to gate signals), that is, the gate signals of the gate lines in rows 2/4/6/8 may be combined respectively, to obtain a touch signal for connecting with the touch IC; and in a similar way, until the gate signals of the gate lines in rows 1074/1076/1078/1080 are combined to obtain a touch signal for connecting with the touch IC. In this way, when a remaining half of the screen is scanned and displayed, all the touch driving electrode lines are also scanned again, that is, the entire screen has completed a touch scan again. Therefore, the detecting frequency is up to 2 times as higher as the display frequency.

In the embodiment of the present disclosure, the plurality of touch driving electrode lines are connected with each other via the second ITO layer. For example, in the embodiment shown in FIG. 3 and referring to FIG. 1, the plurality of gate lines serving as the touch driving electrode lines in the Gate layer are connected with each other through the second ITO layer (i.e., that is indicated by "2ITO" in FIG. 3) to form one Tx channel. That is, since a via hole 31 is formed in the protective layer in FIG. 3, the second ITO layer may be connected with the Gate layer through the via hole 31, connecting the plurality of gate lines serving as the touch driving electrode lines with each other through the second ITO layer, further forming one Tx channel. For example, the gate signals output from a gate IC are shunted, low-voltage signals are filtered by an ESD device or a filter circuit, and the gate signals are converted to pulse signals of square waves. Since the touch driving electrode lines are connected with each other through the second ITO layer, a touch driving pulse signal in a form of square wave may be formed by combining the pulse signals of square waves together. Thus it is not necessary to provide the touch driving signals by the touch IC, reducing power consumption.

Figure 3:
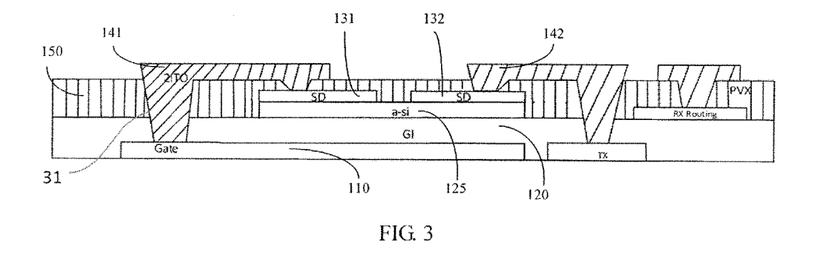
FIG. 3 is a structural schematic diagram of the touch screen provided by the embodiment of the present disclosure.

In addition, the Rx pattern may be also connected with the Rx Routing in the S/D layer through the via hole. In this way, the Rx circuit formed by the Rx pattern and the Rx Routing may timely transmit the received signals to the touch IC, and the touch IC determines a touch position by detecting changes in the received signals. That is, the position of a touch point is determined by means of the Tx and Rx circuits in the touch screen. In FIG. 3, the Tx is connected with the second ITO layer through the via hole formed in the protective layer, and the second ITO layer is connected with the S/D layer through the via hole arranged in the protective layer, so that a display function and a touch function of the touch screen may be realized simultaneously. The S/D layer includes a source electrode and a drain electrode, and may further include a data line; and the Gate layer includes a gate electrode. By adjusting voltages among the three electrodes, a light-emitting unit of the touch screen may be controlled to emit light, so as to realize the display function of the touch screen.

For example, the touch function may be implemented as follows. The Tx sends a touch driving signal which is projected onto the Rx circuit to form a stable current. When a human finger touches the touch screen, because the person touches the ground, equivalent capacitance is generated between the finger and the touch screen, and the touch driving signal may flow into a ground line through the equivalent capacitance. Thus, an amount of charges received by the Rx circuit is reduced. Finally, the touch IC determines a point touched by the finger according to change in intensity of the touch driving signals received by the Rx circuit.

Figure 4:
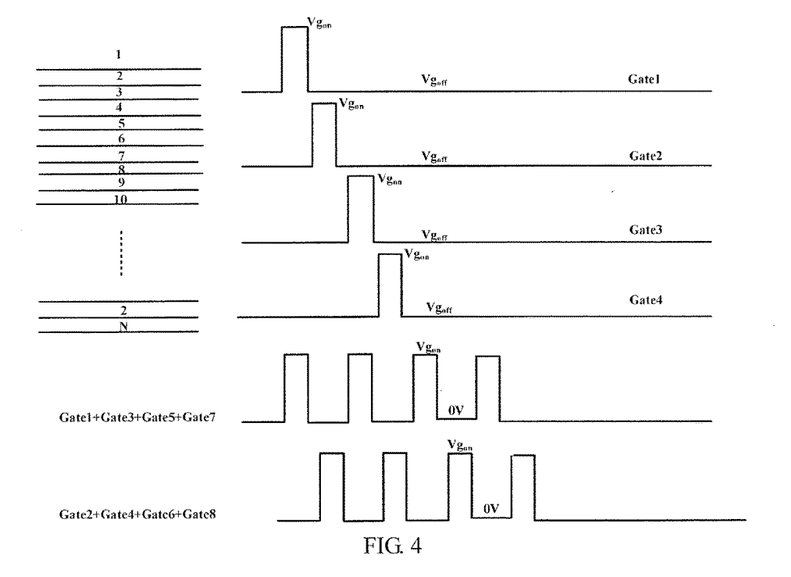
FIG. 4 is a schematic diagram of forming touch driving pulse signals provided by an embodiment of the present disclosure.

As shown in FIG. 4, after the gate IC outputs channel signals of Gate 1, Gate 2, Gate 3, Gate 4, Gate 5, Gate 6, . . . , Gate 2n, that is, the signals applied to the gate lines in rows 1, 2, 3, 4, 5, 6 . . . 2n, for example, signals of Gate 1, Gate 3, Gate 5 and Gate 7 are combined, for example, by an ESD device or a signal processing device, to form a pulse signal having a certain period, or signals of Gate 2, Gate 4, Gate 6 and Gate 8 are combined, for example, by an ESD device or a signal processing device, to form a pulse signal having a certain period, and the pulse signal may be used as a touch driving pulse signal.

Figure 5:
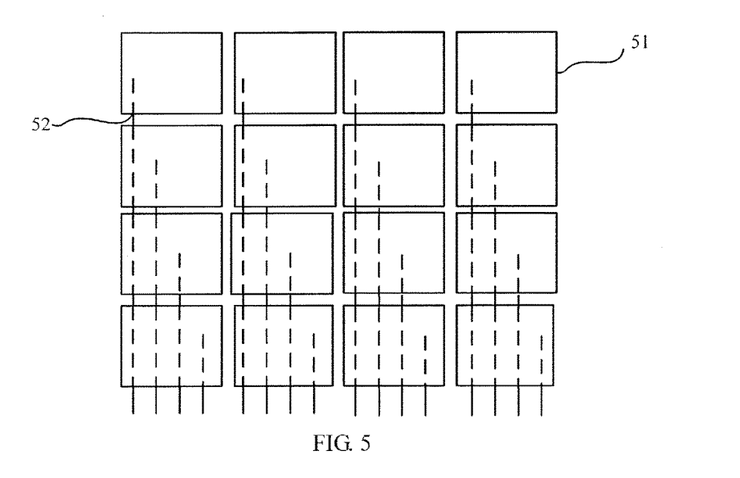
FIG. 5 is a structural schematic diagram of a first type touch sensing electrode pattern provided by an embodiment of the present disclosure.

Referring to FIG. 5, for the Rx pattern 51, for example, a point-to-point design may be employed. The touch IC determines a touch position by only detecting changes in the received signals, and it is not necessary to provide the touch driving signals, so that power consumption may be reduced. The Rx pattern 51 is arranged in the second ITO layer, and is connected with the Rx Routing in the source-drain electrode layer, for example, through the via hole formed in the protective layer, connected with the bonding Pad region, and connected with the Touch IC through a flexible circuit board. In FIG. 5, the Rx pattern 51 may be overlaid on the plurality of gate lines 52.

Figure 6:
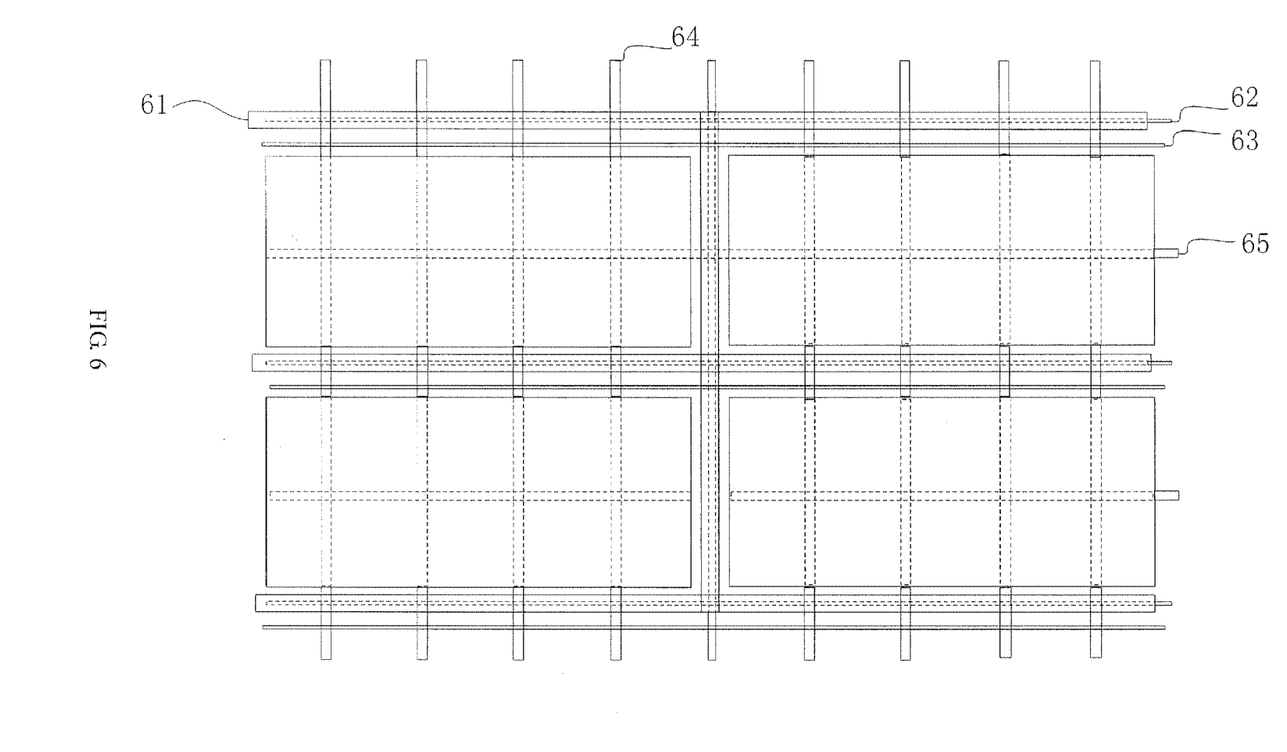
FIG. 6 is a structural schematic diagram of a second type touch sensing electrode pattern provided by an embodiment of the present disclosure.

FIG. 6 shows an exemplary design structure of the Rx pattern. In FIG. 6, the touch sensing electrode patterns 61 are formed by dividing the second ITO layer 65 with the gate lines 62, the touch driving electrode lines 63, the data lines 64 laid perpendicular to the gate lines 62 and the touch driving electrode lines 63, that is, dividing the second ITO layer according to the arrangement of the gate lines 62, the touch driving electrode lines 63 and the data lines 64. The touch sensing electrode patterns 61 are arranged above the gate lines 62. It should be noted that, for example, a portion of the second ITO layer above the touch driving electrode lines 63 is removed, that is, there is no ITO electrode in the corresponding positions; the ITO electrodes above the touch driving electrode lines 63 and the data lines 64 are connected with each other to form pixel electrodes, and remaining portion of the ITO still forms common electrode regions Vcom 65, and is connected through at leas a Vcom metal wire to provide a Vcom signal.

By arranging the touch driving electrode on the gate layer, arranging the touch sensing electrode line on the source-drain electrode layer, and arranging the touch sensing electrode pattern on the second ITO layer, the touch screen provided by the embodiment of the present disclosure may convert gate scanning signals spaced sequentially to touch driving pulse signals, and determine a touch position by a point-to-point design, so that a touch function is realized, a detecting frequency of the touch screen is improved and adverse impact on display is reduced while displaying.

An embodiment of the present disclosure further provides a display device. The display device comprises any touch screen described in the previous embodiment. The display device can be: any product or component having a display function, such as a mobile phone, a tablet computer, a television, a monitor, a laptop computer, a desktop computer, a digital photo frame, a navigator, etc.

By arranging the touch driving electrode in the gate layer, arranging the touch sensing electrode line in the source-drain electrode layer, and arranging the touch sensing electrode pattern in the second ITO layer, the display device provided by the embodiment of the present disclosure may convert gate scanning signals spaced sequentially to touch driving pulse signals, and determine a touch position by a point-to-point design, so that a touch function is realized, a detecting frequency of the touch screen is improved and adverse impact on display is reduced while displaying.

An embodiment of the present disclosure further provides a fabrication method of a touch screen, which is applied to the touch screen shown in the embodiment described above. Referring FIG. 7, the method provided by the embodiment of the present disclosure may comprise steps as follows.

Figure 7:
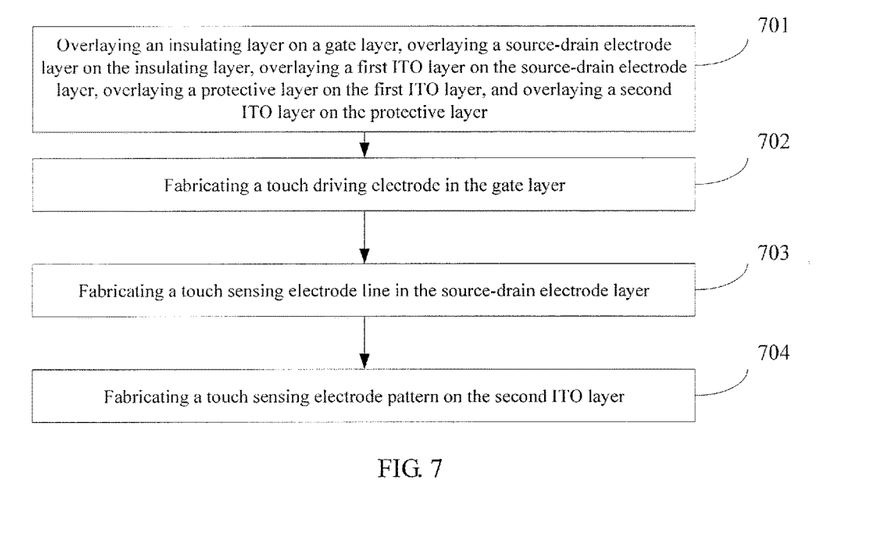
FIG. 7 is a flow chart of a fabrication method of a touch screen provided by an embodiment of the present disclosure.

Step 701: forming an insulating layer on a gate layer, forming a source-drain electrode layer on the insulating layer, forming a first ITO layer on the source-drain electrode layer, forming a protective layer on the first ITO layer, and forming a second ITO layer on the protective layer.

The gate layer may be directly or indirectly formed on a base substrate, and the base substrate may be a glass substrate, a plastic substrate and so on.

Step 702: fabricating a touch driving electrode in the gate layer.

Optionally, the method may further comprise: removing a portion of the second ITO layer above the touch driving electrode line.

Step 703: fabricating a touch sensing electrode line in the source-drain electrode layer.

Optionally, the plurality of gate lines which serves as the touch driving electrode lines are an odd-numbered row of gate lines or an even-numbered row of gate lines.

Optionally, the method may further comprise: combining gate electrode scanning signals output by a plurality of gate lines which serves as touch driving electrode lines by a static impedance ESD device or a signal processing circuit, to generate a touch driving pulse signal.

Step 704: fabricating a touch sensing electrode pattern in the second ITO layer.

Optionally, the method may further comprise: forming a via hole in the protective layer, the touch sensing electrode pattern being connected with the touch sensing electrode line through the via hole in the protective layer.

Optionally, the method may further comprise: dividing the second ITO layer according to an arrangement of the gate line, the touch driving electrode line and a data line laid perpendicular to the gate line and the touch driving electrode line; and a portion of the second ITO layer above the data line serving as the touch sensing electrode pattern.

By arranging the touch driving electrode in the gate layer, arranging the touch sensing electrode line in the source-drain electrode layer, and arranging the touch sensing electrode pattern in the second ITO layer, the fabrication method provided by the embodiment of the present disclosure may convert gate scanning signals spaced sequentially to touch driving pulse signals, and determine a touch position by a point-to-point design, so that a touch function is realized, detecting frequency of the touch screen is improved, and adverse impact on display is reduced while displaying.

It may be understood by those skilled in the art that the whole or part of the steps in the above embodiments may be completed either by hardware, software, firmware and any combination thereof, or by program running on hardware, the program may be stored in a computer-readable storage medium, which may be read-only memory (ROM), magnetic disk, optical disk, etc.

What are described above is related to the illustrative embodiments of the disclosure only and not limitative to the scope of the disclosure; the scopes of the disclosure are defined by the accompanying claims.

The application claims priority to the Chinese patent application No. 201510741385.1, filed Nov. 4, 2016, the entire disclosure of which is incorporated herein by reference as part of the present application.

What is claimed is:

1. A touch screen, comprising a gate layer, an insulating layer, a source-drain electrode layer, a first Indium Tin Oxide (ITO) layer, a protective layer and a second ITO layer, wherein
    the insulating layer is overlaid on the gate layer, the source-drain electrode layer is overlaid on the insulating layer, the first ITO layer is overlaid on the source-drain electrode layer, the protective layer is overlaid on the first ITO layer, and the second ITO layer is overlaid on the protective layer;
    the gate layer includes a touch driving electrode, the source-drain electrode layer includes a touch sensing electrode line, and the second ITO layer includes a touch sensing electrode pattern; and
    the touch sensing electrode pattern in the second ITO layer is connected with the touch sensing electrode line in the source-drain electrode layer through a via hole in the protective layer.

2. The touch screen according to claim 1, wherein the gate layer includes a plurality of gate lines and a plurality of touch driving electrode lines;
    the gate lines are parallel to the touch driving electrode lines, and the gate lines and the touch driving electrode lines are arranged at intervals.

3. The touch screen according to claim 2, wherein the plurality of touch driving electrode lines are connected with each other through the second ITO layer.

4. The touch screen according to claim 2, wherein the touch sensing electrode pattern is formed by dividing the second ITO layer corresponding to the gate lines, the touch driving electrode lines, and data lines laid perpendicular to the gate lines and the touch driving electrode lines, and
    the touch sensing electrode pattern is arranged above the gate lines.

5. The touch screen according to claim 4, wherein no second ITO layer is provided above the touch driving electrode lines, and
    pixel electrodes are formed by a portion of the second ITO layer above the touch driving electrode lines and the data lines.

6. A display device comprising the touch screen, wherein the touch screen comprises:
    a gate layer, an insulating layer, a source-drain electrode layer, a first Indium Tin Oxide (ITO) layer, a protective layer and a second ITO layer, wherein
    the insulating layer is overlaid on the gate layer, the source-drain electrode layer is overlaid on the insulating layer, the first ITO layer is overlaid on the source-drain electrode layer, the protective layer is overlaid on the first ITO layer, and the second ITO layer is overlaid on the protective layer;
    the gate layer includes a touch driving electrode, the source-drain electrode layer includes a touch sensing electrode line, and the second ITO layer includes a touch sensing electrode pattern; and the touch sensing electrode pattern In the second ITO layer is connected with the touch sensing electrode line in the source-drain electrode layer though a via hole in the protective layer.

7. A fabrication method of a touch screen, comprising:
forming an insulating layer on a gate layer;
forming a source-drain electrode layer on the insulating layer;
forming a first Indium Tin Oxide (IT) layer on the source-drain electrode layer, forming a protective layer on the first ITO layer;
forming a second ITO layer on the protective layer; and
wherein the gate layer includes a touch driving electrode; the source-drain electrode layer includes a touch sensing electrode line; and the second ITO layer includes a touch sensing electrode pattern
forming a via hole in the protective layer;
wherein the touch sensing electrode pattern is connected with the touch sensing electrode line through the via hole in the protective layer.

8. The method according to claim 7, further comprising:
combining gate electrode scanning signals output by a plurality of gate lines serving as touch driving electrode lines, to form a touch driving pulse signal.

9. The method according to claim 8, wherein the plurality of gate lines serving as the touch driving electrode lines include gate lines in odd-numbered columns or gate lines in even-numbered columns.

10. The method according to claim 7, further comprising:
dividing the second ITO layer in accordance with an arrangement of the gate line, the touch driving electrode line and a data line laid perpendicular to the gate line and the touch driving electrode line;
wherein a portion of the second ITO layer above the gate line serve as the touch sensing electrode pattern.

11. The method according to claim 7, further comprising:
removing a portion of the second ITO layer above the touch driving electrode line.

\* \* \* \* \*

UNITED STATES PATENT AND TRADEMARK OFFICE
CERTIFICATE OF CORRECTION

Page 1 of 1

PATENT NO. : 10,114,504 B2
APPLICATION NO. : 15/341222
DATED : October 30, 2018
INVENTOR(S) : Jinglong Yan It is certified that error appears in the above-identified patent and that said Letters Patent is hereby corrected as shown below:

On the Title Page

Item (30) showing the Foreign Application Priority Data is required to be amended from:
"Nov. 20, 2015 (CN)     201510741385"

To:
"Nov. 4, 2015 (CN)     201510741385" .

Signed and Sealed this
Second Day of March, 2021

Drew Hirshfeld
*Performing the Functions and Duties of the
Under Secretary of Commerce for Intellectual Property and
Director of the United States Patent and Trademark Office*